United States Patent Office 2,923,666
Patented Feb. 2, 1960

2,923,666

PRODUCTION OF VITAMIN $B_{12}$

Robert M. Stern, Whitefish Bay, Wis., assignor to Pabst Brewing Company, Milwaukee, Wis., a corporation of Delaware No Drawing. Application February 5, 1954
Serial No. 408,577

21 Claims. (Cl. 195—80)

This invention relates to the production of vitamin $B_{12}$, more particularly, to a microbial fermentation process for producing vitamin $B_{12}$. The invention is especially concerned with a fermentation process carried out in the presence of materials which enhance the production of vitamin $B_{12}$-active compounds, including vitamin $B_{12}$.

This application is a continuation-in-part of my copending application Serial Number 344,889, filed March 26, 1953, and now abandoned, and the disclosure of the latter application is incorporated herein and made a part hereof by reference as fully as if it were set forth herein in its entirety.

It is well known that vitamin $B_{12}$ can be produced by fermentation using a variety of organisms and nutritive substances. As an illustration, U.S. Patent No. 2,595,499 discloses a number of classes of organisms and nutrients for the production of vitamin $B_{12}$. U.S. Patent No. 2,561,364 refers, in particular, to the cultivation of *Flavobacterium devorans* in a suitable medium. U.S. Patent No. 2,576,932 discloses the use of *Bacillus megatherium* in a suitable medium. The amounts of vitamin $B_{12}$ formed in these fermentations generally vary from 0.5 to 1.5 micrograms per gram of culture broth.

It is an object of the present invention to provide a microbial fermentation process furnishing high yields of vitamin $B_{12}$. Although the active substances produced are evaluated in terms of the equivalent amount of vitamin $B_{12}$ and this terminology will be employed herein, the activity content may include also or in the alternative other compounds having vitamin $B_{12}$ activity, also described as vitamin substances having LLD activity, as previously reported, which are meant to be included within the scope of the term.

Another object is to provide a new and improved method of fermenting a nutrient medium with a vitamin $B_{12}$-producing microorganism.

An additional object is to provide a process which is well adapted to commercial production.

A further object is to provide improvements in the production of vitamin $B_{12}$ by microbial fermentation of a nutrient medium.

A specific object is to enhance the production of vitamin $B_{12}$-active compounds in a microbial fermentation process by carrying out the fermentation in the presence of a material which provides yields in excess of those obtained with the usual media.

These and other objects and advantages of the invention will appear on consideration of the specification.

It has now been discovered in accordance with the invention that the production of vitamin $B_{12}$ by microbial fermentation can be markedly increased by carrying out the fermentation in the presence of a quaternary ammonium compound, by which is meant the hydroxide or a salt of the base, particularly a beta-substituted aliphatic quaternary ammonium compound, or in the presence of malt sprouts. In an especially advantageous embodiment, a combination of the ammonium compound and malt sprouts is incorporated in the fermentation medium.

Of the quaternary ammonium compounds useful in the invention, those having at least one methyl group, preferably three methyl groups, attached to the quaternary nitrogen atom are very suitable, and especially those having a reactive function on at least one of the four organic radicals, that is, a functional group such as one of the acylatable groups, hydroxyl, carboxyl and amino. Tetralkyl ammonium compounds are preferred, especially lower alkyl compounds, and alkyl trimethyl compounds are further preferred, particularly those wherein the alkyl radical is beta-substituted, the alkyl radical then necessarily containing at least two carbon atoms. Examples of compounds which are particularly effective are N-trimethylglycine, which has the same chemical structure as betaine in water or aqueous medium, choline, and their water-soluble salts. These compounds have the following general formulae:

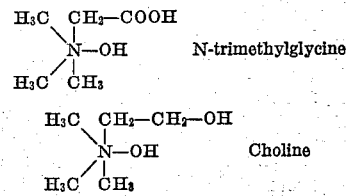

The ammonium compounds which are preferred for the purpose of the invention are characterized by containing alkyl groups attached to the nitrogen of the molecule and are generally referred to in nutritional studies as transalkylating compounds. In order to avoid any harmful contaimination of the resultant product, it is usually desirable to employ addition agents of the type described which are substantially non-toxic.

The ammonium compounds are organic bases and salts thereof. The salts are derived from the bases by the addition of the corresponding acids, for example, hydrochloric acid, nitric acid, or sulfuric acid. The chlorides are preferred in the practice of the invention.

In the compounds which have been found to be especially effective addition agents, the nitrogen atom is linked to four alkyl groups, at least one of which preferably has a reactive function, such as a hydroxylic, amino, carboxylic or other reactive function, on a beta carbon atom. Stated another way, the compound preferably contains a radical or group such as

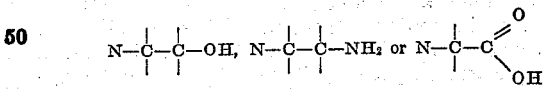

each of the free bonds preferably joining a hydrogen or an alkyl radical, especially a lower alkyl radical, to the carbon atom. By "alkyl" is meant methyl, ethyl, propyl, and higher homologues, having straight or branched chains, but it will be understood that the size and character of the alkyl group must be such that the compound is still soluble in the microbial aqueous fermentation medium and is not toxic to the microorganism in the medium.

The quantity of the ammonium compound which is added to the microbial fermentation medium is subject to some variation, depending upon the particular addition agent employed and upon the composition of the fermentation medium. A minor, effective amount is employed, which is preferably at least about 0.1% by weight of the fermentation medium, and the further preferred amount is around 0.2% to 2% by weight of the medium. Larger amounts can be used, but there appears to be no substantial added advantage in the employment of amounts above about several percent.

The term "malt sprouts" describes the rootlets formed during the germination of barley or like grain, e.g., wheat, rye, or oats, produced as a by-product of malted grain. The quantity of malt sprouts added to the fermentation medium is also subject to some variation, depending upon the source of the sprouts and upon the composition of the fermentation medium. A minor, effective amount is employed, which is preferably at least about 0.5% by weight of the fermentation medium, and the further preferred amount is 1% to 3% by weight of the fermentation medium. Larger amounts can be used, but there appears to be no substantial added advantage in the employment of more than about several percent.

The preferred process involves fermentation in the presence of both the ammonium compound and malt sprouts, each in about the same proportion as when used alone, as described above. Optimum yields of vitamin $B_{12}$ appear to be obtained when about 0.5% of ammonium compound and about 2–3% of malt sprouts are incorporated in the medium.

In the invention, a vitamin $B_{12}$-producing microorganism is employed; for example, a medium is fermented with one of the above organisms known to produce vitamin $B_{12}$. Fermentation is very desirably carried out by culturing a vitamin $B_{12}$-producing strain of a bacterial microorganism, particularly of an organism of the family Rhizobiaceae (see D. H. Bergey et al., 1948, Manual of Determinative Bacteriology, 6th ed., 223–234, The Williams & Wilkins Company, Baltimore). Of this family, the genera Rhizobium and Agrobacterium are preferably employed. In the genus Rhizobium, vitamin $B_{12}$-producing organisms are found most frequently among the species *Rhizobium meliloti*. In the genus Agrobacterium, vitamin $B_{12}$-producing organisms are found among typical strains of the species *Agrobacterium radiobacter* and among atypical strains of this species. In particular, a strain isolated from soil and designated as K–300 has been found to produce vitamin $B_{12}$ in considerable amounts. This strain differs in minor details from a typical *Agrobacterium radiobacter* (as described in Bergey's Manual, pages 227–228) in that it does not produce demonstrable amounts of $H_2S$ and gives no browning on mannitol-calcium-glycerophosphate agar, although it does give browning on other media such as mannitol-yeast extract agar. Production of vitamin $B_{12}$-active compounds by fermentation with an organism of the genus Agrobacterium is claimed broadly in copending application Serial Number 426,279, filed April 28, 1954, now U.S. Patent 2,798,840, dated July 9, 1957.

The fermentation medium may have the usual components employed for this purpose, i.e., a source of assimilable nitrogen, such as a proteinaceous substance, a source of assimilable carbon, such as a carbohydrate, and trace elements, particularly cobalt. Among the proteinaceous and carbohydrate materials which can be used are yeast extracts, casein digests, meat extracts, steep liquors, distillers solubles, soya, glucose, sucrose, molasses and a great variety of similar substances. Suitable media are illustrated in the patents previously referred to. The ammonium compound, or malt sprouts, or both, are incorporated in the medium, preferably prior to sterilization and inoculation, although they may be added at other times. Submerged, agitated and aerated fermentation is ordinarily preferred for industrial operation.

The pH of the fermentation is preferably within the range of about 6.5 to 8.2, the optimum usually being about 7.5. The pH may be controlled by adding dextrose, sucrose or similar substances which are fermented to organic acids, by the addition of mineral acids or by adding ammonium hydroxide. If the pH is allowed to become too high, the higher alkalinity tends to decompose the desired end product or prevent its formation and thereby decrease the yield. If the pH is allowed to become too low, the growth of the organism is inhibited, and the yield of the desired end product is thereby reduced.

Fermentation is advantageously carried out at a temperature of about 25–30° C., preferably about 28° C. The inoculated medium is agitated and aerated, and fermentation is allowed to proceed until the optimum, usually the maximum, vitamin $B_{12}$ production is achieved. The vitamin $B_{12}$ content is then recovered from the fermented medium by known methods.

The following examples are furnished to assist in providing a complete understanding of the invention, but it is to be understood that the invention is not limited thereto nor to the specific ingredients, proportions and procedures set forth therein, which are given only for purposes of illustration.

*Example 1*

To media containing 1% meat extract, 1% corn steep solids, 1% dextrose, 3% sucrose and 15 p.p.m. of cobalt as $CoSO_4.7H_2O$, varying amounts of choline were added, as indicated in the following table. Forty-milliliter portions of these media to which choline chloride had been added were adjusted to pH 7.5 and placed in 250 ml. Erlenmeyer flasks. The flasks and their contents were sterilized for 15 minutes at 120° C. After sterilization, the contents of the flasks were inoculated with 2 ml. of a 24-hour culture of *Rhizobium trifolii*. After 4 days incubation at 28° C. on a rotary shaker, the vitamin $B_{12}$ content of the fermentation broths was determined by a modification of the proposed USP method (U.S. Pharm., XIV, third suppl., 15–19) using *Lactobacillus leichmannii* ATCC 7830 as the test organism. The results were as follows:

| Amount of Choline Chloride Added, Percent | Vitamin $B_{12}$ Content, Micrograms per Gram of Broth |
| --- | --- |
| 0.00 | 1.08 |
| 0.25 | 2.2 |
| 0.5 | 2.6 |

*Example 2*

A basal medium of the following composition was prepared:

| | | |
| --- | --- | --- |
| Sucrose | percent | 5 |
| Yeast extract (Difco) | do | 0.25 |
| $(NH_4)_2HPO_4$ | do | 0.4 |
| $Na_2SO_4$ | do | 0.2 |
| KCl | do | 0.08 |
| Citric acid | do | 0.05 |
| $Mg^{++}$ as $MgSO_4.7H_2O$ | p.p.m. | 50 |
| $Ca^{++}$ as $Ca(NO_3)_2.4H_2O$ | p.p.m. | 50 |
| $Mn^{++}$ as $MnSO_4.4H_2O$ | p.p.m. | 15 |
| $Fe^{++}$ as $FeSO_4.7H_2O$ | p.p.m. | 5 |
| $Zn^{++}$ as $ZnCl_2$ | p.p.m. | 5 |
| $Co^{++}$ as $CoSO_4.7H_2O$ | p.p.m. | 5 |
| Tap water to make | percent | 100 |

Eight liters of this medium were placed into one stirred jar fermentor and eight liters into a second similar fermentor to which 0.5% choline chloride had been added. Both media were adjusted to pH 7, and the jars sterilized for 60 minutes at 121° C. Each fermentor was inoculated with 400 ml. of a 24 hour culture of *Bacillus megatherium* (NRRL B–938) and incubated at 28° C. for 35 hours under suitable conditions of agitation and aeration for submerged culture fermentation. At one hour intervals during the fermentation the pH was determined and controlled at 6.5 to 7 by the addition of ammonium hydroxide. At 12 hours an additional 5% sucrose was added to both jars.

A sample of broth taken from each tank at the end of 35 hours was assayed for vitamin $B_{12}$ by the method described in Example 1. The results are listed below.

| Amount of Choline Chloride Added, Percent | Vitamin $B_{12}$ Content, Millimicrograms per Gram of Broth |
| --- | --- |
| None | 110 |
| 0.5 | 195 |

Example 3

To media containing 1% meat extract, 1% corn steep solids, 1% dextrose, 3% sucrose and 15 p.p.m. of cobalt as $CoSO_4 \cdot 7H_2O$, varying amounts of betaine hydrochloride were added, as indicated in the following table. Forty-milliliter portions of these media containing betaine hydrochloride were adjusted to pH 7.5 and placed in 250 ml. Erlenmeyer flasks. The flasks were sterilized and incubated as described in Example 1. Each flask was inoculated prior to incubation with 2 ml. of a 24 hour culture of *Rhizobium meliloti*. After 4 days incubation, the vitamin $B_{12}$ content of the fermentation broths was determined. The results were as follows:

| Amount of Betaine Hydrochloride Added, Percent | Vitamin $B_{12}$ Content, Micrograms per Gram of Broth |
| --- | --- |
| 0.00 | 1.05 |
| 0.25 | 1.75 |
| 0.5 | 2.4 |
| 1.0 | 2.63 |

Example 4

The procedure of Example 3 was repeated, inoculating the flasks with 2 ml. of a 24 hour culture of a bacterial microorganism known to produce vitamin $B_{12}$. The results were as follows:

| Amount of Betaine Hydrochloride Added, Percent | Vitamin $B_{12}$ Content, Micrograms per Gram of Broth |
| --- | --- |
| 0 | 0.74 |
| 0.25 | 1.56 |
| 0.5 | 2.12 |
| 1 | 2.58 |
| 2 | 3.0 |

Example 5

To a basal medium containing 1% corn steep liquor solids, 2% meat extract, 4% sucrose, and 15 p.p.m. of cobalt as $CoSO_4 \cdot 7H_2O$, choline (as choline chloride) or betaine (as betaine hydrochloride) were added as indicated in the table below. The media were dispensed, sterilized, inoculated, and incubated as in Example 4. After 4 days incubation the vitamin $B_{12}$ content of the broths was determined. The results obtained are tabulated below.

| Additions to Basal Medium | Vitamin $B_{12}$ Content, Micrograms per Gram of Broth |
| --- | --- |
| None | 0.8 |
| 0.5% choline chloride | 1.6 |
| 0.5% betaine hydrochloride | 2.3 |

Example 6

To media containing 1% meat extract, 1% corn steep solids, 1% dextrose, 3% sucrose and 15 p.p.m. of cobalt at $CoSO_4 \cdot 7H_2O$, varying amounts of barley malt sprouts were added, as indicated in the following table. Forty milliliter portions of these media to which malt sprouts had been added were adjusted to pH 7.5 and placed in 250 ml. Erlenmeyer flasks. The flasks and their contents were sterilized for 15 minutes at 120° C. After sterlization, the flasks were cooled and the contents inoculated with 2 ml. from a 24 hour liquid culture of *Rhizobium trifolii*. The inoculated flasks then were incubated at 28° C. for four days on a rotary shaker. Upon completion of the incubation period, the vitamin $B_{12}$ content of the fermentation broths was determined. The results were as follows:

| Amount of Malt Sprouts Added, Percent | Vitamin $B_{12}$ Content, Micrograms per Gram of Broth |
| --- | --- |
| 0 | 0.73 |
| 1 | 1.28 |
| 2 | 1.88 |
| 3 | 2.53 |

Example 7

To media containing 1% meat extract, 1% corn steep solids, 1% dextrose, 3% sucrose and 15 p.p.m. of cobalt as $CoSO_4 \cdot 7H_2O$, 0.5% choline chloride and varying amounts of barley malt sprouts were added, as indicated in the following table. Forty milliliter portions of these media to which malt sprouts and choline chloride had been added, were adjusted to pH 7.5 and placed in 250 ml. Erlenmeyer flasks. The flasks and their contents were sterilized for 15 minutes at 120° C. After sterilization, the flasks were cooled and the contents inoculated with 2 ml. from a 24 hour liquid culture of *Rhizobium trifolii*. The inoculated flasks then were incubated at 28° C. for 4 days on a rotary shaker, at which time the fermentation broths were assayed for vitamin $B_{12}$ content. The results were as follows:

| Amount of Malt Sprouts Added, Percent | Amount of Choline Chloride Added, Percent | Vitamin $B_{12}$ Content, Micrograms per Gram of Broth |
| --- | --- | --- |
| 0.0 | 0.5 | 2.73 |
| 0.5 | 0.5 | 2.8 |
| 1.0 | 0.5 | 2.8 |
| 2.0 | 0.5 | 3.0 |
| 3.0 | 0.5 | 3.25 |

Example 8

To media containing 1% meat extract, 1% corn steep solids, 1% dextrose, 3% sucrose and 15 p.p.m. of cobalt as $CoSO_4 \cdot 7H_2O$, varying amounts of malt sprouts were added as indicated in the table below. Forty milliliter portions of these media to which malt sprouts had been added were adjusted to pH 7.5 and placed in 250 ml. Erlenmeyer flasks. The flasks and their contents were sterilized for 15 minutes at 121° C. After sterilization, the flasks were cooled and the contents inoculated with 2 ml. from a 24 hour liquid culture of an Agrobacterium species. The inoculated flasks then were incubated at 28° C. for four days on a rotary shaker. Upon completion of the incubation period the vitamin $B_{12}$ content of the fermentation broths was determined. The results obtained were as follows:

| Amount of Malt Sprouts Added, Percent | Vitamin $B_{12}$ Content, Micrograms per Gram of Broth |
| --- | --- |
| 0 | 0.81 |
| 0.5 | 0.89 |
| 1 | 1.36 |
| 2 | 1.77 |
| 3 | 2.28 |

Example 9

To media of the same composition as described in Example 8, varying amounts of choline chloride were added as indicated in the following table. Forty milliliter portions of these media to which the choline chloride had been added were adjusted to pH 7.5 and placed in 250 ml. Erlenmeyer flasks. The flasks were sterilized for 15 min. at 121° C. The flasks were cooled and the contents inoculated with 2 ml. from a 24 hour liquid culture of a species of Agrobacterium. After incubation of the flasks at 28° C. for four days, the fermentation broths were assayed for vitamin $B_{12}$ activity. The results obtained were as follows:

| Amount of Choline Chloride Added, Percent | Vitamin $B_{12}$ Content, Micrograms per Gram of Broth |
|---|---|
| 0 | 0.81 |
| 0.25 | 2.20 |

Example 10

To media of the same composition as described in Example 8, varying amounts of betaine hydrochloride were added as indicated in the following table. Forty milliliter portions of these media were dispensed in 250 ml. Erlenmeyer flasks after adjustment of the pH to 7.5. The flasks were sterlized for 15 min. at 121° C. After sterilization, the flasks were cooled and the contents inoculated with 2 ml. from a 24 hour liquid culture of an Agrobacterium species. The inoculated flasks then were incubated at 28° C. for four days on a rotary shaker. Upon completion of the incubation period, the vitamin $B_{12}$ content of the fermentation broths was determined. The results obtained were as follows:

| Amount of Betaine Hydrochloride Added, Percent | Vitamin $B_{12}$ Content, Micrograms per Gram of Broth |
|---|---|
| 0 | 0.81 |
| 0.25 | 2.3 |
| 0.5 | 3.34 |
| 1 | 3.88 |
| 2 | 4.32 |

Example 11

To media containing 1% meat extract, 1% corn steep solids, 1% dextrose, 3% sucrose, 3% malt sprouts and 15 p.p.m. of cobalt as cobalt sulfate septahydrate, 0.5% choline chloride or betaine hydrochloride was added as indicated in the table below. Forty milliliter portions of these media to which choline chloride or betaine hydrochloride had been added were adjusted to pH 7.5 and placed in 250 ml. Erlenmeyer flasks. The flasks and their contents were subjected to a sterilization of 15 min. at 121° C. After sterilization, the flasks were cooled and the contents inoculated with 2 ml. from a 24 hour liquid culture of a species of Agrobacterium. The inoculated flasks then were incubated at 28° C. for four days on a rotary shaker. Upon completion of the incubation period, the vitamin $B_{12}$ content was determined. The results obtained were as follows:

| Amount of Malt Sprouts Added, Percent | Amount of Choline Chloride Added, Percent | Amount of Betaine Hydrochloride Added, Percent | Vitamin $B_{12}$ Content, Micrograms per Gram of Broth |
|---|---|---|---|
| 0 | 0 | 0 | 0.81 |
| 0 | 0.5 | 0 | 1.69 |
| 3 | 0 | 0 | 2.28 |
| 3 | 0.5 | 0 | 3.22 |
| 0 | 0 | 0.5 | 3.34 |
| 3 | 0 | 0.5 | 4.02 |

Example 12

To media containing 1% meat extract, 1% corn steep solids, 1% dextrose, 3% sucrose and 15 p.p.m. of cobalt as $CoSO_4 \cdot 7H_2O$, varying amounts of malt sprouts were added as indicated in the table below. Forty milliliter portions of these media to which malt sprouts had been added were adjusted to pH 7.5 and placed in 250 ml. Erlenmeyer flasks. The flasks and their contents were sterilized for 15 min. at 121° C. After sterilization, the flasks were cooled and the contents inoculated with 2 ml. from a 24 hour culture of a bacterial species belonging to the family Rhizobiaceae, Agrobacterium variant K–300. The inoculated flasks were then incubated at 28° C. for four days on a rotary shaker. Upon completion of the incubation period, the vitamin $B_{12}$ content of the fermentation broths was determined. The results obtained were as follows:

| Amount of Malt Sprouts Added, Percent | Vitamin $B_{12}$ Content, Micrograms per Gram of Broth |
|---|---|
| 0 | 0.715 |
| 0.5 | 1.05 |
| 1 | 1.74 |
| 2 | 2.10 |
| 3 | 2.82 |

Example 13

To media of the same composition as described in Example 12, varying amounts of choline chloride were added as indicated in the following table. The procedure was otherwise the same as that of Example 12. The results obtained were as follows:

| Amount of Choline Chloride Added, Percent | Vitamin $B_{12}$ Content, Micrograms per Gram of Broth |
|---|---|
| 0 | 0.715 |
| 0.25 | 2.55 |

Example 14

To media of the same composition as described in Example 12, varying amounts of betaine hydrochloride were added as indicated in the following table. The procedure was otherwise the same as that of Example 12. The results obtained were as follows:

| Amount of Betaine Hydrochloride Added, Percent | Vitamin $B_{12}$ Content, Micrograms per Gram of Broth |
|---|---|
| 0 | 0.715 |
| 0.25 | 2.35 |
| 0.5 | 3.32 |
| 1 | 3.64 |
| 2 | 3.70 |

Example 15

To media containing 1% meat extract, 1% corn steep solids, 1% dextrose, 3% sucrose, 3% malt sprouts, and 15 p.p.m. of cobalt as $CoSO_4 \cdot 7H_2O$, 0.5% choline chloride or betaine hydrochloride was added as indicated in the table below. The procedure was otherwise the same as that of Example 12. The results obtained were as follows:

| Amount of Malt Sprouts Added, Percent | Amount of Choline Chloride Added, Percent | Amount of Betaine Hydrochloride Added, Percent | Vitamin $B_{12}$ Content, Micrograms per Gram of Broth |
|---|---|---|---|
| 0 | 0 | 0 | 0.715 |
| 0 | 0.5 | 0 | 2.11 |
| 3 | 0 | 0 | 2.82 |
| 3 | 0.5 | 0 | 3.34 |
| 0 | 0 | 0.5 | 3.32 |
| 3 | 0 | 0.5 | 4.34 |

From the foregoing examples, it will be observed that the addition of a quaternary ammonium compound or of malt sprouts resulted in a greatly increased yield of vitamin $B_{12}$ from the microbial fermentation as compared with the yield obtained where no such additive was used. Furthermore, it is possible to surpass the yield produced by either of these additives by combining them in the medium, to furnish considerably increased production. There is thus provided by the invention a valuable process which increases the availability and reduces the cost of the vitamin $B_{12}$-active compounds.

The invention is hereby claimed as follows:

1. In a process for producing vitamin $B_{12}$ by microbial fermentation, the improvement which comprises carrying out the fermentation of a vitamin $B_{12}$-producing strain of a microorganism of the family Rhizobiaceae in the presence of malt sprouts and of a substantially non-toxic amount in excess of about 0.1% by weight of the fermentation medium of a quaternary ammonium compound which is soluble in the fermentation medium and non-toxic to the microorganism in said medium.

2. In a process for producing vitamin $B_{12}$ by microbial fermentation, the improvement which comprises carrying out the fermentation of a vitamin $B_{12}$-producing strain of a microorganism of the family Rhizobiaceae in the presence of a substantially non-toxic amount in excess of about 0.1% by weight of the fermentation medium of a quaternary ammonium compound which is soluble in the fermentation medium and non-toxic to the microorganism in said medium.

3. In a process for producing vitamin $B_{12}$ by microbial fermentation, the improvement which comprises carrying out the fermentation of a vitamin $B_{12}$-producing strain of a microorganism of the family Rhizobiaceae in the presence of a substantially non-toxic amount in excess of about 0.1% by weight of the fermentation medium of a tetralkyl quaternary ammonium compound containing at least one methyl group attached to the quaternary nitrogen atom, having a reactive function on at least one of the alkyl groups and which is soluble in the fermentation medium and non-toxic to the microorganism in said medium.

4. In a process for producing vitamin $B_{12}$ by microbial fermentation, the improvement which comprises carrying out the fermentation in the presence of malt sprouts, and recovering the vitamin $B_{12}$ content from the fermented medium.

5. In a process for producing vitamin $B_{12}$ by microbial fermentation, the improvement which comprises carrying out the fermentation of a vitamin $B_{12}$-producing strain of a microorganism of the family Rhizobiaceae in the presence of malt sprouts and of a substantially non-toxic amount in excess of about 0.1% by weight of the fermentation medium of a beta-substituted tetralkyl quaternary ammonium compound which is soluble in the fermentation medium and non-toxic to the microorganism in said medium.

6. The process which comprises fermenting a nutrient medium with a vitamin $B_{12}$-producing microorganism of the family Rhizobiaceae in the presence of 1-3% of malt sprouts and of 0.2-2% of a beta-substituted tetralkyl quaternary ammonium compound which is soluble in the fermentation medium and non-toxic to the microorganism in said medium, the percentages being by weight of the fermentation medium.

7. The process which comprises fermenting a nutrient medium with a vitamin $B_{12}$-producing bacterial microorganism in the presence of malt sprouts, and recovering the vitamin $B_{12}$ content from the fermented medium.

8. The process which comprises fermenting a nutrient medium with a vitamin $B_{12}$-producing strain of a microorganism of the genus Rhizobium of the family Rhizobiaceae in the presence of a substantially non-toxic amount in excess of about 0.1% by weight of the fermentation medium of a beta-substituted tetralkyl quaternary ammonium compound which is soluble in said medium and non-toxic to the microorganism in the medium.

9. The process which comprises fermenting a nutrient medium with a vitamin $B_{12}$-producing strain of a microorganism of the genus Agrobacterium of the family Rhizobiaceae in the presence of a substantially non-toxic amount in excess of about 0.1% by weight of the fermentation medium of a beta-substituted tetralkyl quaternary ammonium compound which is soluble in said medium and non-toxic to the microorganism in the medium.

10. The process which comprises fermenting a nutrient medium with a vitamin $B_{12}$-producing strain of a microorganism of the genus Rhizobium of the family Rhizobiaceae in the presence of malt sprouts, and recovering the vitamin $B_{12}$ content from the fermented medium.

11. The process which comprises fermenting a nutrient medium with a vitamin $B_{12}$-producing strain of a microorganism of the genus Agrobacterium of the family Rhizobiaceae in the presence of malt sprouts, and recovering the vitamin $B_{12}$ content from the fermented medium.

12. The process which comprises fermenting a nutrient medium with a vitamin $B_{12}$-producing strain of a microorganism of the family Rhizobiaceae in the presence of malt sprouts and of a substantially non-toxic amount in excess of about 0.1% by weight of the fermentation medium of choline.

13. The process which comprises fermenting a nutrient medium with a vitamin $B_{12}$-producing strain of a microorganism of the family Rhizobiaceae in the presence of malt sprouts and of a substantially non-toxic amount in excess of about 0.1% by weight of the fermentation medium of betaine.

14. In a process for producing vitamin $B_{12}$ by microbial fermentation, the improvement which comprises carrying out the fermentation of a vitamin $B_{12}$-producing strain of a microorganism of the family Rhizobiaceae in the presence of a substantially non-toxic amount in excess of about 0.1% by weight of the fermentation medium of choline.

15. In a process for producing vitamin $B_{12}$ by microbial fermentation, the improvement which comprises carrying out the fermentation of a vitamin $B_{12}$-producing strain of a microorganism of the family Rhizobiaceae in the presence of a substantially non-toxic amount in excess of about 0.1% by weight of the fermentation medium of betaine.

16. The process which comprises fermenting a nutrient medium maintained at a pH of 6.5 to 8.2 with a vitamin $B_{12}$-producing strain of a microorganism of the family Rhizobiaceae in the presence of a substantially non-toxic amount in excess of about 0.1% by weight of the fermentation medium of choline.

17. The process which comprises fermenting a nutrient medium maintained at a pH of 6.5 to 8.2 with a vitamin $B_{12}$-producing strain of a microorganism of the family Rhizobiaceae in the presence of a substantially non-toxic amount in excess of about 0.1% by weight of the fermentation medium of betaine.

18. The process which comprises fermenting a nutrient medium with a vitamin $B_{12}$-producing strain of a microorganism of the family Rhizobiaceae in the presence of malt sprouts, and recovering the vitamin $B_{12}$ content from the fermented medium.

19. The process which comprises fermenting a nutrient medium with a vitamin $B_{12}$-producing strain of a microorganism of the family Rhizobiaceae in the presence of about 0.5–3% by weight of the fermentation medium of malt sprouts, and recovering the vitamin $B_{12}$ content from the fermented medium.

20. The process which comprises fermenting a nutrient medium maintained at a pH of 6.5 to 8.2 with a vitamin $B_{12}$-producing strain of a microorganism of the family Rhizobiaceae in the presence of a substantially non-toxic amount in excess of about 0.1% by weight of the fermentation medium of a quaternary ammonium compound which is soluble in the fermentation medium and non-toxic to the microorganism in said medium.

21. In a bacteriological process for producing vitamin substances having LLD activity, utilizing a vitamin $B_{12}$ producing microorganism, the improvement which comprises adjusting the betaine content of the fermentation medium, by the addition of substantially pure betaine, to substantially non-toxic amount of betaine in excess of about 0.1% by weight of the medium.

References Cited in the file of this patent

UNITED STATES PATENTS

| | | |
|---|---|---|
| 2,132,712 | Ward | Oct. 11, 1938 |
| 2,576,932 | Garibaldi | Dec. 4, 1951 |
| 2,595,499 | Wood et al. | May 6, 1952 |

OTHER REFERENCES

Porter, Bacterial Chemistry and Physiology, 1946, Wiley, 303, 748 to 750. (QR–84–P15 Sci. Lib.)

Ann. Review of Microbiology, 7, 1953, page 447. (QR–41–A7 Sci. Lib.)